United States Patent [19]

Lantz

[11] Patent Number: 4,490,104
[45] Date of Patent: Dec. 25, 1984

[54] APPARATUS FOR SEPARATING A LOW VISCOSITY MATERIAL FROM A HIGH VISCOSITY MATERIAL

[75] Inventor: John M. Lantz, Parkersburg, W. Va.

[73] Assignee: Borg-Warner Chemicals, Inc., Parkersburg, W. Va.

[21] Appl. No.: 443,837

[22] Filed: Nov. 22, 1982

[51] Int. Cl.$^3$ .............................................. B29B 1/00
[52] U.S. Cl. ................................... 425/197; 210/188; 210/258; 210/405; 210/523; 100/90; 100/117; 264/102; 425/203; 425/205; 425/208; 425/376 A; 425/405 R; 425/DIG. 60
[58] Field of Search ............... 210/258, 523, 406, 415, 210/DIG. 15, 405, 188, 180; 100/117, 145, 90; 264/68, 101, 102; 425/197, 203, 205, 208, 376 A, 405 R, DIG. 60

[56] References Cited

U.S. PATENT DOCUMENTS

| | | | |
|---|---|---|---|
| 2,246,045 | 6/1941 | Hirschberg | 100/147 |
| 2,712,799 | 7/1955 | Braibanti et al. | 264/102 |
| 2,970,341 | 2/1961 | Mallory | 425/380 |
| 3,035,306 | 5/1962 | Rossiter | 100/117 |
| 3,225,453 | 12/1965 | Burner | 34/12 |
| 3,230,865 | 1/1966 | Hibbel et al. | 210/415 |
| 3,518,936 | 7/1970 | Bredeson | 100/117 |
| 3,548,743 | 12/1970 | Pikel | 100/145 |
| 3,587,450 | 6/1971 | Smith | 100/117 |
| 3,599,292 | 8/1971 | Ronzoni et al. | 425/203 |
| 3,633,880 | 1/1972 | Newmark | 425/208 |
| 3,742,093 | 6/1973 | Skidmore | 264/349 |
| 3,859,217 | 1/1975 | Holstead | 210/523 |

FOREIGN PATENT DOCUMENTS

| | | | |
|---|---|---|---|
| 144390 | 1/1936 | Austria | 425/197 |
| 1361831 | 7/1963 | France | 425/203 |

Primary Examiner—Ernest G. Therkorn
Attorney, Agent, or Firm—Richard J. Schlott

[57] ABSTRACT

A two-stage, screw-fed vertical mechanical separator for separating a low viscosity material from a high viscosity material, wherein the bulk of the low viscosity material is removed in the first stage and the high viscosity material is heated as a result of mechanical working through a restriction into a second stage and subjected to a vacuum to flash off residual low viscosity material.

2 Claims, 2 Drawing Figures

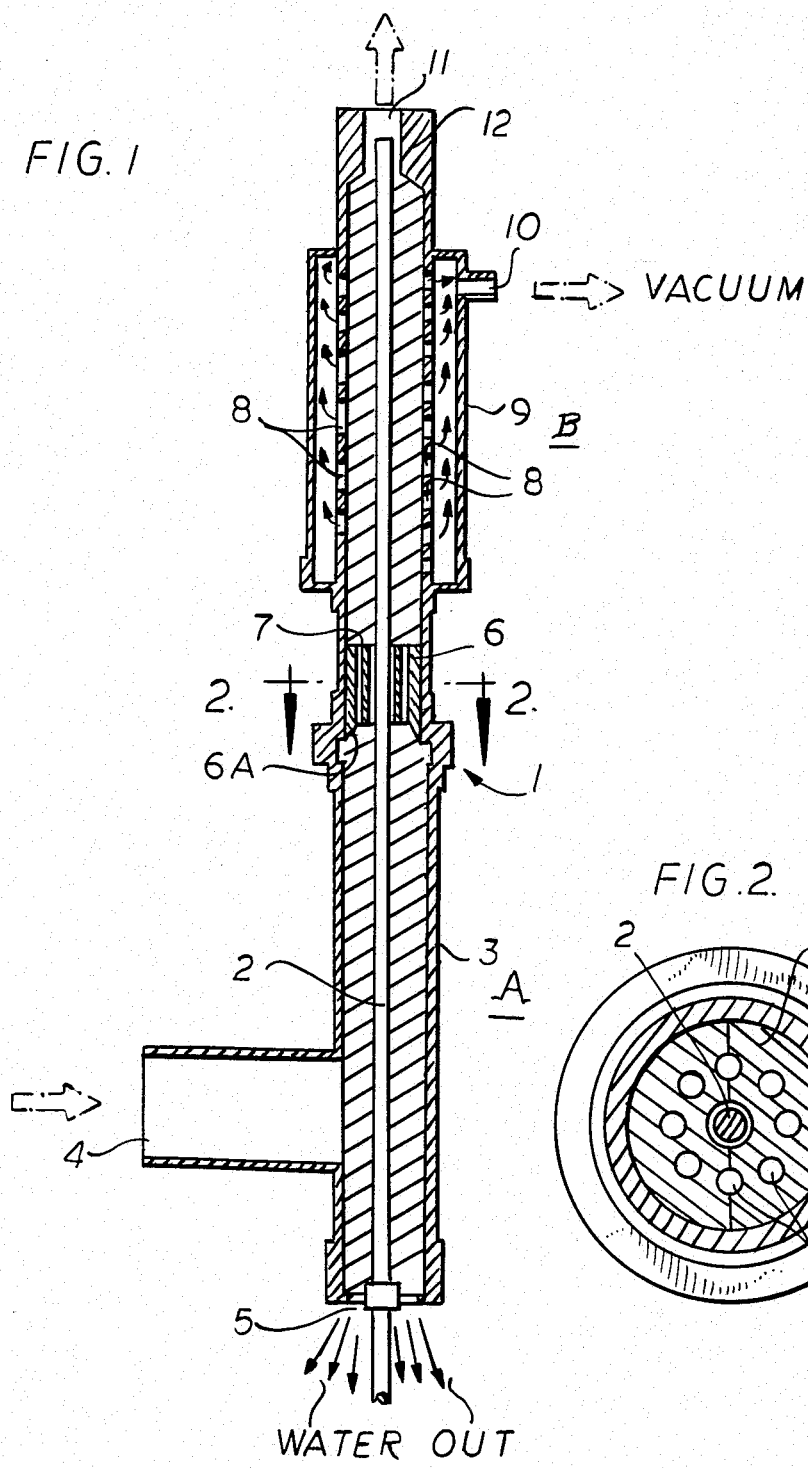
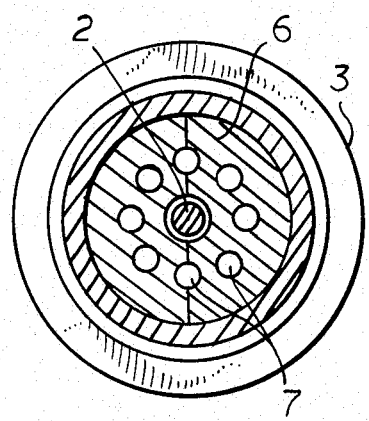

APPARATUS FOR SEPARATING A LOW VISCOSITY MATERIAL FROM A HIGH VISCOSITY MATERIAL

BACKGROUND OF THE INVENTION

There are numerous apparatus known and employed for separating mixtures of low viscosity materials from high viscosity materials. These methods and apparatus range from simple mechanical squeezing to sophisticated chemical and mechanical techniques.

Generally, the separating technique employed depends upon the type of mixture and the degree of separation desired. One specific mixture requiring separation is a coagulated aqueous emulsion of a polymer which has been prepared by reacting one or more monomers in the presence of an aqueous emulsion. It is desired to separate the coagulant, the polymer, from the aqueous portion, water, so that no more than 8% moisture is present in the coagulant.

Among the numerous techniques employed in the prior art for removing water from a polymer-water mixture is a vertical dewatering screw machine which utilizes an increasing root diameter screw to squeeze the mixture and recover a polymer which contains about 11.5% moisture. However, in order to attempt to reach the 8% residual moisture goal, it is necessary to transfer the polymer from the vertical dewatering screw machine to a second piece of equipment, i.e., a vacuum vented, twin screw extruder.

U.S. Pat. No. 3,859,217 discloses a vertical screw machine for removing water from a coagulant-water slurry. At Col. 6, L. 17, of the aforesaid patent it is stated that the dewatered coagulant is estimated to contain about 10 weight percent water.

U.S. Pat. No. 3,587,450 discloses a horizontal screw machine for continuously removing water from wet elastomer crumb in a first dewatering section and then removing water vapor by heat in a subsequent vaporizing section. It is stated that 5 to 12 percent moisture remains after the first section, and that the remaining water is vaporized and removed as steam in the vaporizing section. In this latter section heat may be supplied, and the frictional heat generated by mechanical working and tearing of the material being dried contributes significantly to the total heat available for the drying action.

The major problems with the aforementioned prior art equipment are (1) the moistures cannot be reduced to the level required, (2) heat must be supplied from an external source to effect the drying action and (3) no vacuum can be applied in the same piece of equipment.

SUMMARY OF THE INVENTION

The present invention comprises a vertical mechanical separator for the substantially complete separation of a low viscosity material from a high viscosity material. The separator of this invention is a two stage screw machine. In the first stage, a mixture containing low viscosity material and high viscosity material is squeezed through a restriction formed by an abrupt barrel diameter reduction of the screw machine. This mechanical squeezing forces the separation of the low viscosity material from the high viscosity material. The low viscosity material exists from the first stage of the machine by gravity flow and the high viscosity material is forced through the restriction where shear forces raise the temperature of the material. The heated high viscosity material enters the second stage of the machine which is exposed to vacuum. As the heated material enters the second stage, the screw flights of the screw machine slice the material to expose more surface area to vacuum. Thus, any moisture present in the material in the second stage is flashed off.

BRIEF DESCRIPTION OF THE DRAWING

FIG. 1 is a longitudinal, schematic, cross-sectional view of the two stage vertical separator of the present invention.

FIG. 2 is an enlarged radial section taken generally on line 2—2 of FIG. 1.

DETAILED DESCRIPTION

Referring now to the drawings in FIG. 1, there is disclosed a vertical two stage separator 1 comprising a rotatable feed screw 2. The feed screw 2 is adapted to be rotated by a conventional motor and gearing (not shown), and is disposed within a vertically disposed cylindrical barrel 3. The first stage of the separator 1 is indicated generally by the letter A. The first stage A contains a material feed port 4 near the bottom of the barrel 3 and a plurality of outlet ports 5 in the bottom of the barrel.

At the top of the first stage A, the inside diameter of the barrel 3 is substantially reduced to form a restriction or throttle created by a cylindrical die 6 having a plurality of longitudinal passages 7. The entrance to the die 6 is tapered, the degree of the taper 6A, the length of die 6 and the number and size of passages 7 being fitted to the rheology of the material being processed so that mechanical energy can be converted to frictional and shear heat in passages 7. As will be seen in FIG. 2, in this embodiment die 6 is formed in two pieces for ease of assembly within barrel 3. Die 6 will be held within barrel 3 by any of a variety of means well known in the art including set screws, pins, and the like (not shown). The material being processed also acts to form a seal between the first and second stages.

The second stage of the present separator 1 is indicated by the letter B. It includes a plurality of longitudinal slots 8 in the barrel 3. These slots are more or less conventional and permit water vapor to escape from the barrel 3 without loss of the material passing through the barrel 3. That portion of the barrel 3 containing the slots 8 is surrounded by a housing 9 having a port 10 connected to a vacuum pump (not shown). The second stage B contains a material discharge port 11 at the top of the barrel 3. Also, the uppermost portion of the housing 3 has a reduced or throttle portion 12. The reduced portion 12 causes the material being processed to form an upper seal for the second stage B.

The use of a vacuum-vented second stage in connection with the elevated temperatures permits flash removal of the remaining volatile component and a rapid reduction of the moisture content to well below 8%. In prior art devices, a substantial heat input is required to accomplish a thorough drying of the material being processed, either by heating the screw and barrel components of these devices, or by transferring the material to a separate drier. In the present invention, the seals created by the material at restriction, die 6 and throttle 12 permit the application of a vacuum to the second stage, making thorough drying of the material practical.

EXAMPLE

A graft acrylonitrile-butadiene-styrene (ABS) aqueous latex containing 38 wt. percent solids is coagulated with a magnesium sulfate solution to form an aqueous mixture. The mixture is fed to the the feed port 4 of the two stage separator 1 as the screw 3 is rotated. The mixture is lifted by the screw 3 toward the taper 6A and die 6. When the mixture reaches the die 6, there is an abrupt squeezing of the mixture. The coagulated ABS material solids separate from the water and continue through the passages 7 of the die 6. The water runs down the screw 3 by gravity and discharges through the outlet ports 5.

As the coagulated ABS is forced by the screw 3 through the passages 7 of die 6 and into the second stage B, the screw cuts the ABS material resulting in (1) the creation of heat and (2) the creation of high surface area. As the thus processed ABS material enters the second stage B, the remaining water, now in the form of vapor, is extracted through port 10 by the vacuum. The vaporizing effect takes place throughout the barrel 3 containing the longitudinal slots 8 so that as the ABS is forced by the screw 3 through the discharge port 11, it is substantially devoid of water in any form.

While the present invention has been described with respect to the separation of water from an aqueous ABS latex, the invention is obviously applicable to the separation of other low viscosity/high viscosity mixtures. Typically, the invention can be used to separate water from natural rubber or from synthetic elastomers such as polybutadiene, butadiene-styrene copolymers, ethylene propylene-diene terpolymers and the like.

I claim:

1. A two stage apparatus for separating a low viscosity material from a high viscosity material comprising a vertically disposed cylindrical barrel, a feed screw disposed within said barrel throughout substantially the entire height thereof, a first stage adapted to remove substantially all the low viscosity material from the high viscosity material and a second stage located above said first stage and adapted to remove the remainder of the low viscosity material from the high viscosity material, said first stage including a material feed port in said barrel near the bottom thereof, at least one low viscosity outlet port at the bottom of the barrel below said feed port, said first stage terminating at a restriction in said barrel, said restriction comprising a die having a plurality of longitudinal passages communicating between said first and second stages, said second stage beginning above said restriction and comprising a plurality of slots in said barrel, means for applying a vacuum to said barrel, and a discharge port located at the top of the second stage, whereby substantially all the low viscosity material is removed from the high viscosity material in the first stage and is discharged by gravity through said outlet port, and the remainder of said low viscosity material is removed in the form of vapor in the second stage of said apparatus by said vacuum and said high viscosity material is discharged devoid of low viscosity material through the discharge port at the top of the second stage.

2. The apparatus of claim 1 wherein said restriction comprises a die having a tapered entrance from said first stage and a plurality of longitudinal passages communicating between said entrance and said second stage.

* * * * *